United States Patent [19]
Oka

[11] Patent Number: 6,027,178
[45] Date of Patent: Feb. 22, 2000

[54] BRAKE SYSTEM

[75] Inventor: Hiroyuki Oka, Higashimatsuyama, Japan

[73] Assignee: Jidosha Kiki Co., Ltd., Tokyo, Japan

[21] Appl. No.: 08/858,453

[22] Filed: May 19, 1997

[30] Foreign Application Priority Data

May 30, 1996 [JP] Japan .................................. 8-136796

[51] Int. Cl.⁷ ................................................ B60T 13/18
[52] U.S. Cl. .............................. 303/11; 303/115.4; 303/3; 303/15
[58] Field of Search .............................. 303/113.4, 115.4, 303/116.1, 116.2, 125, 11, 10, 3, 20, 15

[56] References Cited

U.S. PATENT DOCUMENTS

| | | | |
|---|---|---|---|
| 4,453,782 | 6/1984 | Arikawa et al. ..................... | 303/116.1 |
| 4,703,979 | 11/1987 | Nakanishi et al. ................... | 303/116.1 |
| 5,213,399 | 5/1993 | Burgdorf et al. ..................... | 303/115.4 |
| 5,290,098 | 3/1994 | Burgdorf et al. ..................... | 303/115.4 |
| 5,741,050 | 4/1998 | Ganzel et al. ................... | 303/115.4 X |

*Primary Examiner*—Robert J. Oberleitner
*Assistant Examiner*—Robert A. Siconolfi
*Attorney, Agent, or Firm*—Kanesaka & Takeuchi

[57] ABSTRACT

In a brake system, when a braking force tends to be insufficient, a first switching valve is set at an interrupting position to render a control chamber in a sealed state, and a pump is actuated to render a supplemental pressure-regulating valve in operation. Thus, MCY pressure supplied to a port of the supplemental pressure-regulating valve is increased to move a supplemental pressure piston downwardly to close the supplemental pressure-regulating valve. The fluid pressure from the pump is supplied to a brake cylinder to increase the braking force. In this manner, a supplemental braking control is provided to ensure the braking even when the braking force tends to be insufficient. The system can be made simple.

4 Claims, 4 Drawing Sheets

BRAKE SYSTEM

BACKGROUND OF THE INVENTION

The present invention relates to a brake system for a vehicle, and more particularly to a brake system with a supplemental braking system which intensifies the braking forces to ensure the operation of brakes particularly when the braking forces are insufficient.

As for a vehicle such as an automobile, a wheel (wheels) is sometimes locked when braking the vehicle, thereby rendering the driving unsteady and extending the stopping distance. Therefore, conventionally, anti-skid brake systems (hereinafter, sometimes referred to as "ABS") of various types for giving an anti-skid brake control (hereinafter, sometimes referred to as "ABS control") when a braked wheel is locked have been proposed. According to the ABS control, when a tendency toward wheel lock is detected during braking, the tendency toward wheel lock is canceled by decreasing the braking forces and then by intensifying the braking forces again, with the result that the driving is stabilized and the stopping distance is minimized.

Figure 4:
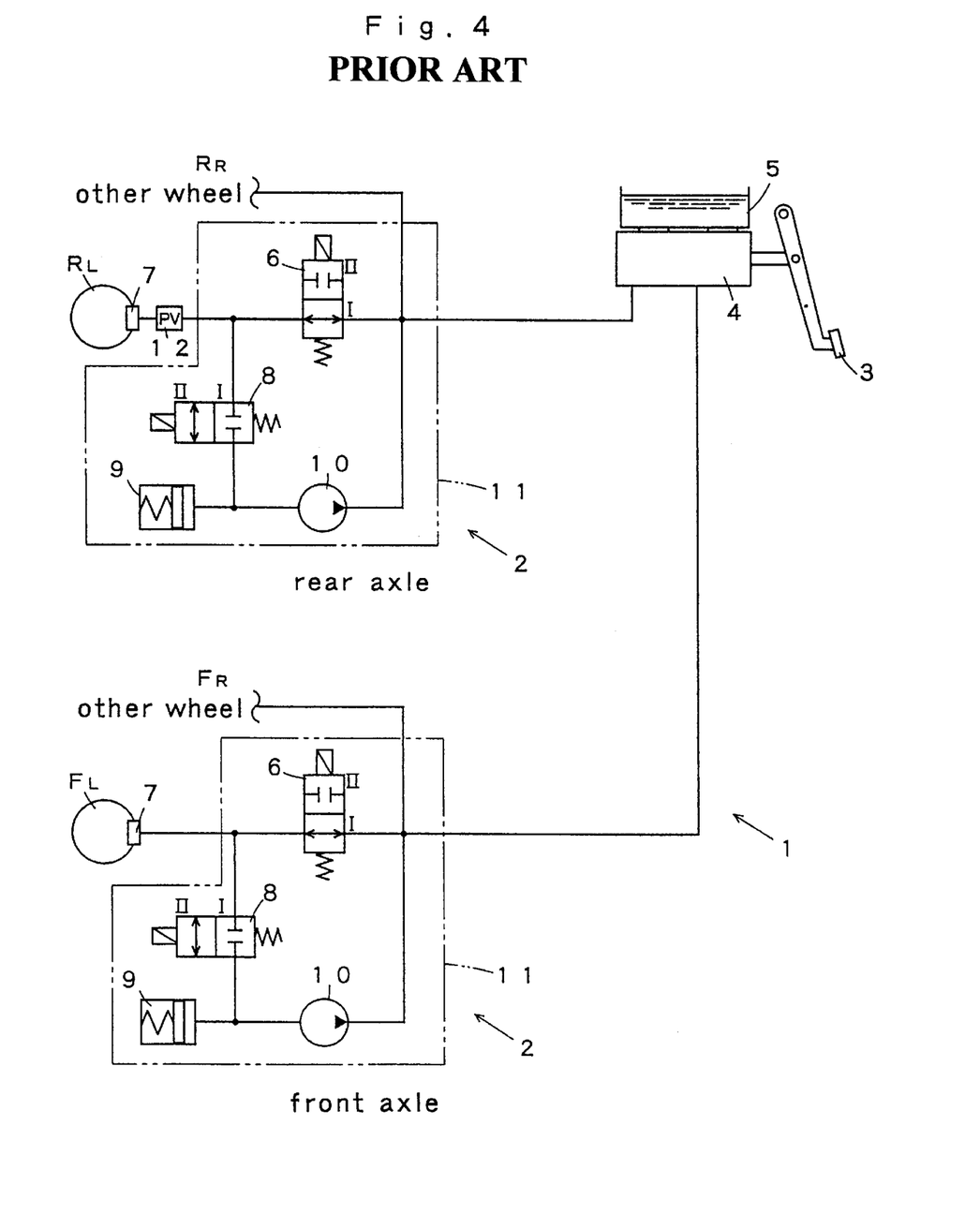
FIG. 4 is a view showing an example of a brake system which is provided with conventional ABSs.

FIG. 4 is a view showing a brake system having ABSs of return pump type as an example of the conventional ABS. This brake system 1 is a dual circuit hydraulic brake actuating system in which front and rear wheels F, R are independent, and comprises ABSs 2 each provided for each braking circuit. Like parts of the respective brakes are given by like reference numerals.

In FIG. 4, the numeral 3 designates a brake pedal, 4 designates a tandem master cylinder (hereinafter, sometimes referred to as "MCY"), the numeral 5 designates a reservoir of the master cylinder 4, the numeral 6 designates each ABS control holding valve which is a normally open solenoid valve in which a communicating position I and an interrupting position II are set, the numeral 7 designates each wheel cylinder (hereinafter, sometimes referred to as W/C) which communicates with the master cylinder 4 through a brake fluid line, the numeral 8 designates each ABS control pressure-reducing valve which is a normally closed solenoid valve in which an interrupting position II and a communicating position II are set, the numeral 9 designates each sump which is a low pressure accumulator, the numeral 10 designates each ABS control pump (hereinafter, sometimes referred to "pump" only), the numeral 11 designates each ABS control modulator comprising the ABS control holding valve 6, the ABS control pressure-reducing valve 8, the sump 9, and the pump 10, and the numeral 12 designates a proportioning valve (hereinafter, sometimes referred to as "PV") for the rear wheel for reducing the upward gradient of the brake pressure when exceeding a predetermined value.

Though the brake system 1 is shown only for the front left wheel FL and the rear left wheel RL, the front right wheel FR and the rear right wheel RR are provided with the respective ABS control modulators 11 in the same manner.

In the fluid pressure brake system 1 having such conventional ABSs 2, when no force is exerted on the brake pedal 3, the pumps 10 are not actuated so as not to work and the ABS control holding valves 6 and the ABS control pressure-reducing valves 8 are set at the positions I as shown in the drawing. Therefore, the W/Cs 7 of the front and rear wheels F, R communicates with the reservoir 5 of the MCY 4 and no W/C pressure Pw in the W/Cs 7 i.e. no fluid pressure is produced.

Upon pedaling the brake pedal 3 for normal braking, the MCY 4 produces MCY fluid pressure Pm which is transferred to the respective W/Cs 7 through the ABS control holding valves 6 in the front wheel brakes and through the ABS control holding valves 6 and PVs 12 in the rear wheel brakes, thereby braking all of the front and rear wheels F, R.

Upon releasing the brake pedal 3 to cancel the braking, the MCY 4 does not work so as not to produce the MCY fluid pressure Pm, thereby canceling the braking on the front and rear wheels F, R.

When it is detected that at least one of the front and rear wheels F, R is in locking tendency, an electronic control unit, not shown, sets the ABS control holding valves 6 in the ABS control modulators 11 of the front and rear wheels F, R at the interrupting positions II to hold the brake fluid pressures in the W/Cs 7 at the brake fluid pressure at this point to prevent the tendency toward wheel lock from glowing. When it is detected that at least one of wheels is still in the locking tendency even after holding the brake fluid pressure, the electronic control unit sets the ABS control pressure-reducing valve 8 corresponding to that wheel at the communicating position II to discharge the brake fluid of the corresponding W/C 7 to the sump 9 in order to reduce the brake fluid pressure of the W/C 7 and to actuate the corresponding pump 10.

Upon reducing the brake fluid pressure, the tendency toward wheel lock is canceled and the rotation of the wheel is restored to some extent. Then, the electronic control unit sets the ABS control pressure-reducing valve 8 at the interrupting position I and sets the ABS control holding valve 6 at the communicating position I. Therefore, fluid pressure Pp from the pump 10 as well as the MCY fluid pressure Pm is supplied to W/C 7 to increase the brake fluid pressure of the W/C 7 again.

The electronic control unit controls the ABS control holding valves 6, the ABS control pressure-reducing valves 8, and the pumps 10. In this manner, the ABS control is performed by holding, reducing, and increasing the brake fluid pressures until completely canceling the tendency toward wheel lock.

In the brake system 1 with such ABSs 2, for example when there is a high probability that the vehicle comes into collision and an emergency braking is needed, a driver e.g. a beginner who is unpracticed in driving can not pedal the brake pedal 3 with all his/her might in such a manner as to produce the maximum braking force. Therefore, the braking forces are insufficient and braking forces needed for emergency braking are not given, so that it is impossible to ensure the emergency braking. In a brake system provided with a vacuum brake booster or a fluid-pressure brake booster, there is a probability that braking forces needed for emergency braking are not given when the pressure produced by the pressure source of the brake booster is reduced for some reason.

Therefore, it is desirable that the brake system 1 is provided with a supplemental braking system which intensifies the braking forces to ensure the braking particularly in such a case that the braking forces are insufficient. It is also desirable that the brake system is made as simply as possible to restrict the increase in cost when the supplemental braking system is incorporated in the brake system which has a fluid pressure control system such as ABS 2.

SUMMARY OF THE INVENTION

It is an object of the present invention to provide a brake system which intensifies braking forces to ensure the braking when it is detected that the braking forces are insufficient, yet enables the system to be simplified.

In order to achieve this object, the present invention provides a brake system comprising a brake operating member, a master cylinder which is actuated by operating the brake operating member to develop master cylinder fluid pressure with brake fluid, a brake cylinder to which the master cylinder fluid pressure is applied through a brake fluid line to produce braking forces, a brake fluid pump for supplying the brake fluid to the brake fluid line, a fluid pressure-regulating means for regulating the brake fluid pressure, a controller for controlling the fluid pressure-regulating means, the controller controlling the fluid pressure-regulating means for performing brake fluid pressure control. The brake system further comprises a supplemental pressure-regulating means disposed on the way of the brake fluid line between the master cylinder and a supplying portion into which the brake fluid pump supplies the brake fluid, the supplemental pressure-regulating means having a booster piston and a control chamber, wherein the booster piston allows the master cylinder fluid pressure as it is to pass to the brake cylinder when the booster piston is in non-operation and prevents the master cylinder fluid pressure to pass therethrough when the booster piston is in operation, and the master cylinder fluid pressure is freely supplied to the control chamber when the control chamber is opened so that the booster piston is held in non-operation, and the booster piston is held in operation when the control chamber is sealed; and a first switching valve controlled by the controller, wherein the first switching valve makes the control chamber open when the first switching valve is in operation, and makes the control chamber sealed when the first switching valve is in non-operation, wherein the controller actuates the first switching valve and actuates the brake fluid pump so as to operate the booster piston of the supplemental pressure-regulating means when the braking forces tend to be insufficient.

In addition, in the present invention the fluid pressure-regulating means is a modulator which operates when an anti-skid brake control is provided, the modulator comprising a holding valve for holding the brake fluid pressure in the brake cylinder, a pressure-reducing valve for reducing the brake fluid pressure in the brake cylinder, a low pressure accumulator into which the brake fluid is discharged from the brake cylinder when the brake fluid pressure is reduced, and an anti-skid control pump constituting the brake fluid pump which supplies the brake fluid, discharged into the low pressure accumulator, to the brake fluid line, and wherein the suction side of the anti-skid control pump is formed to communicate with the brake fluid line between the supplemental pressure-regulating means and the master cylinder through a second switching valve, and the controller opens the second switching valve at least when the braking forces tend to be insufficient.

In the brake system of the present invention as structured above, the controller does not actuate the first switching valve when the braking forces do not tend to be insufficient. Therefore, the control chamber of the supplemental pressure-regulating means is held in its open state so that the booster piston does not operate. The master cylinder fluid pressure is supplied as it is to the brake cylinder for normal braking. The controller controls the fluid pressure-regulating means when it is decided that the brake fluid pressure requires to be controlled, thereby conducting the brake fluid pressure control. The controller actuates the first switching valve and actuates the brake fluid pump of the fluid pressure-regulating means when it is decided that the braking forces tend to be insufficient. Therefore, the control chamber of the supplemental pressure-regulating means is held in the sealed state and the booster piston is brought into operation so that the master cylinder fluid pressure is increased linearly by the discharge pressure of the brake fluid pump. The booster piston is actuated to increase the fluid pressure and supplies the increased fluid pressure to the brake cylinder. In this manner, the supplemental braking control is provided. Therefore, even when the braking forces are insufficient during braking, the braking forces are intensified to ensure the operation of brakes.

Since the brake fluid pressure is increased continuously by the booster piston during the supplemental braking control, the brake fluid pressure of the brake cylinder is continuously and smoothly increased. Therefore, since the braking forces vary continuously corresponding to the leg-power on the brake pedal when the supplemental braking control is provided, the driver does not feel a sense of incongruity. For the supplemental braking control, the brake fluid pressure can be adjusted corresponding to the will of the driver by the supplemental pressure-regulating means.

In addition, since the pump of fluid pressure-regulating means well known in the art is used as the brake fluid pump for the supplemental braking control, no pump used exclusively for the supplemental braking control is required, thereby structuring the system simply and at low cost.

Particularly, according to the present invention, the ABS control is provided when a tendency toward wheel lock is detected, and the supplemental braking control is provided when a tendency toward insufficient braking forces is detected.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
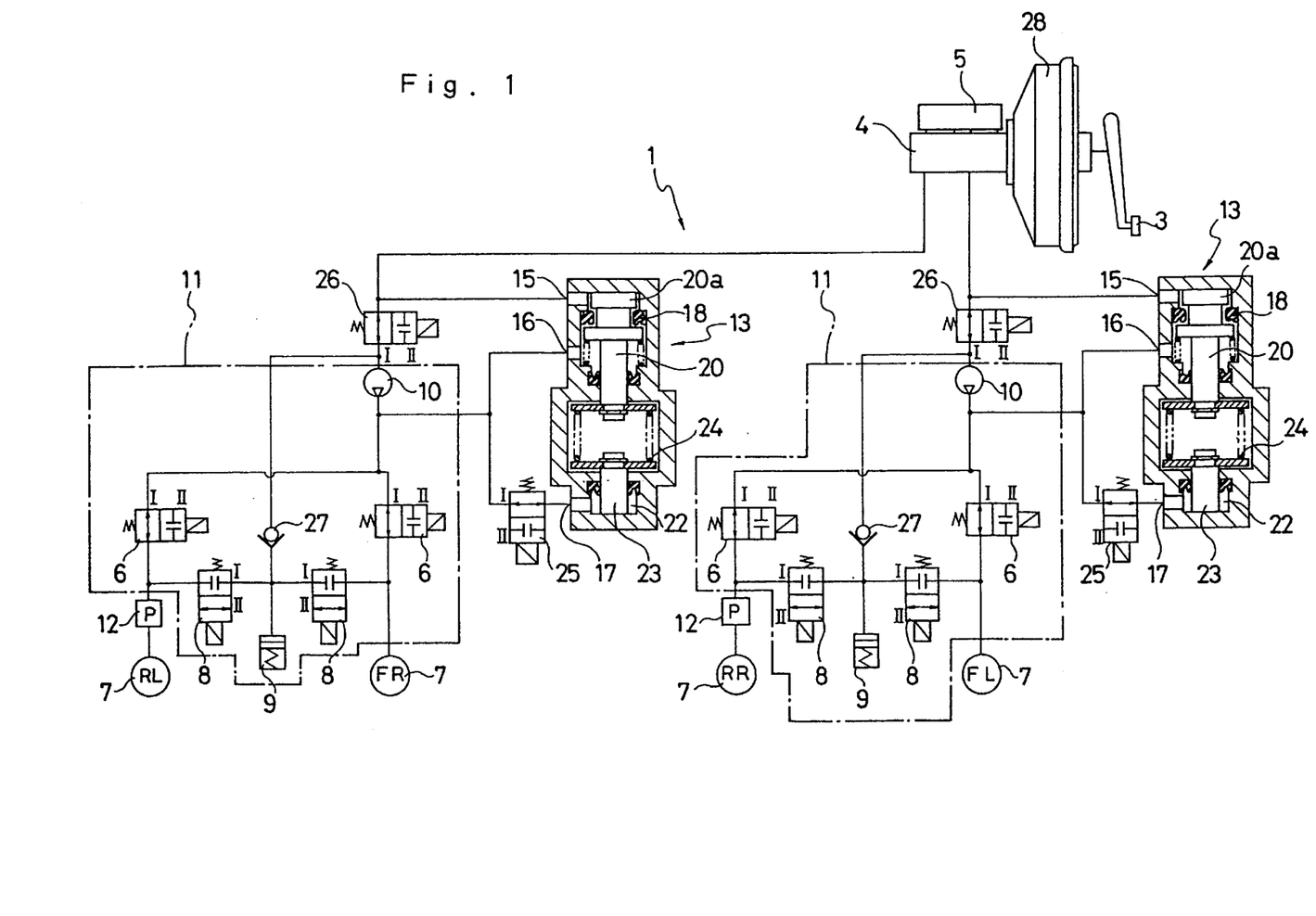
FIG. 1 is a view showing one embodiment of a brake system in accordance with the present invention.

FIG. 1 is a view showing one embodiment of a brake system in accordance with the present invention. It should be noted that like parts are given by like reference numerals as used in the conventional brake system mentioned above so as to omit the detail description about the parts.

As shown in FIG. 1, a brake system 1 of this embodiment is a dual braking circuit system with X-type piping comprising two braking circuits one of which is provided for the front left wheel FL and the rear right wheel RR and the other one is provided for the front right wheel FR and the rear left wheel RL. A sump 9 and an ABS control pump 10 are disposed for each braking circuit so that the sump 9 and the ABS control pump 10 are common to two wheels in one braking circuit.

Each braking circuit has a supplemental pressure-regulating valve 13 disposed on the way of a line connecting a master cylinder 4 with wheel cylinders 7 at the master cylinder 4 side than a connecting point with the discharge side of the pump 10.

Figure 2:
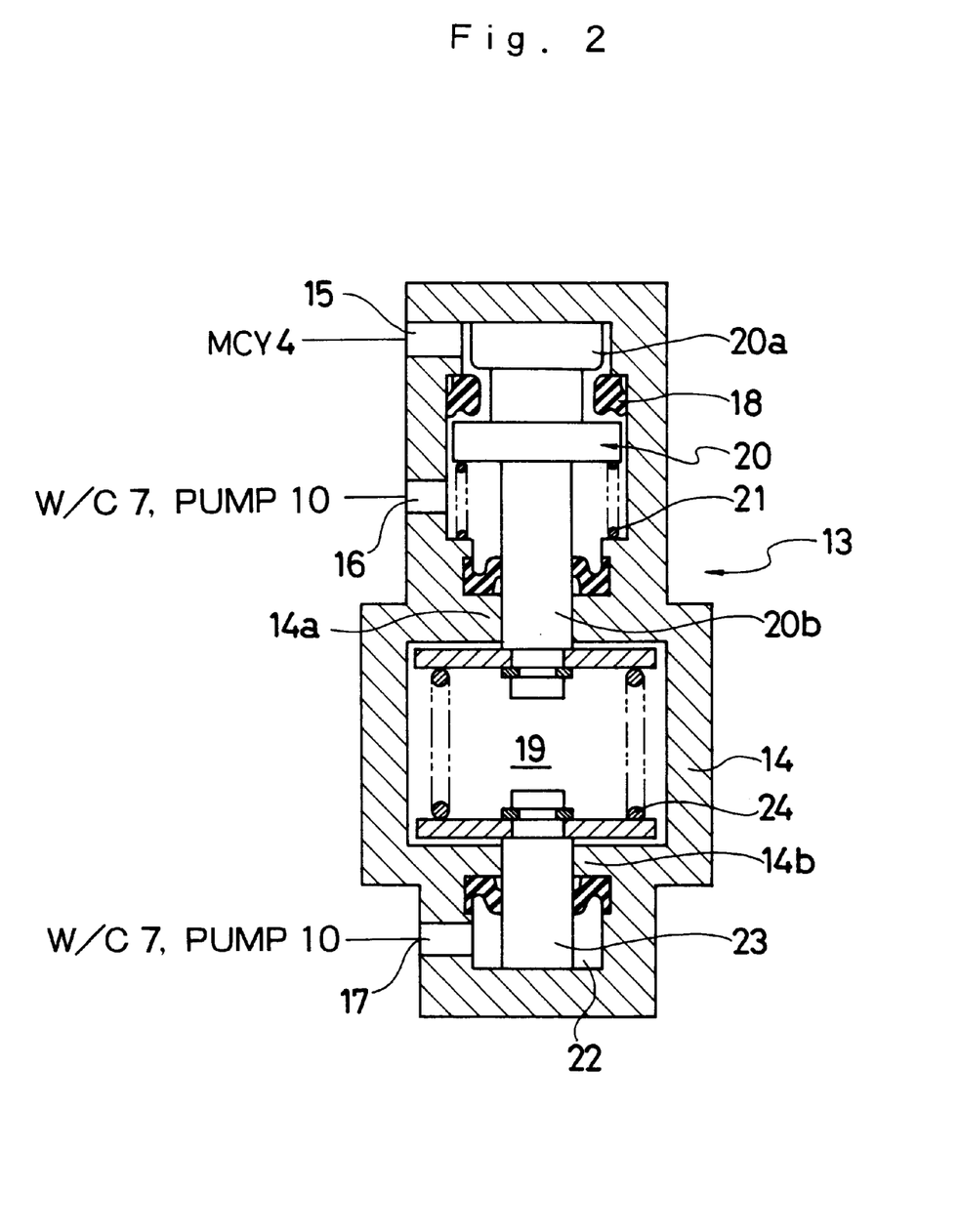
FIG. 2 is a sectional view of a supplemental pressure-regulating valve of the embodiment shown in FIG. 1.

As shown in FIG. 2, the supplemental pressure-regulating valve 13 comprises a housing 14, a MCY connection port 15 formed in the housing 14 to communicate with a MCY 4, a W/C & pump connection port 16 formed in the housing 14 to communicate with the W/Cs 7 and the discharge side of the pump 10, a control pressure supply port 17 formed in the housing 14 to communicate with the W/Cs 7 and the discharge side of the pump 10, a valve seat 18 formed of a ring shaped rubber sheet disposed inside the housing 14 between the MCY connection port 15 and the W/C & pump connection port 16 in such a manner that the valve seat 18 can slide in the passage hole of the housing 14, an air chamber 19 formed between first and second inner walls 14a and 14b of the housing 14, a supplemental pressure piston 20 having a valve portion 20a disposed in such a manner that the valve portion 20a can be seated in and leave from the seat valve 18 and a rod portion 20b which passes through the first inner wall 14a of the housing 14 to extend into the air chamber 19 sealingly holding the fluid-tight state of the air chamber 19, a valve spring 21 which always biases the supplemental pressure piston 20 in such a direction that the valve portion 20a is spaced apart form the valve seat 18 and is set to have a predetermined spring force Fs, a control chamber 22 communicating with the control pressure supply port 17, a control piston 23 of which one end faces the control chamber 22 and the other end passes through the second inner wall 14b of the housing 14 to extend into the air chamber 19 sealingly holding the fluid-tight state of the air chamber 19, and a control spring 24 compressed and disposed between the pistons 20 and 23 in the air chamber 19.

The rod portion 20b of the supplemental pressure piston 20 and the control piston 23 have the same effective area presented to the wind which is set to a predetermined area A. The effective area presented to the wind, i.e. a seat area A1, of the supplemental pressure piston 20 receiving MCY pressure Pm in a state where the valve portion 20a of the supplemental pressure piston 20 is seated in the valve seat 18 is set greater than the effective area presented to the wind of the rod portion 20b and the control piston 23.

The brake system 1 of this embodiment further comprises first switching valves 25 each of which is a normally open solenoid valve in which a communicating position I and an interrupting position II are set to control the communication and interruption of the control chamber 22 relative to the W/Cs 7 and the discharge side of the pump 10 and second switching valves 26 each of which is a normally open solenoid valve in which a communicating position I and an interrupting position II are set to control the communication and interruption between the suction side of the pump 10 and the MCY 4. The numeral 27 designates each check valve allowing only flow of the brake fluid in the direction from the sump 9 to the suction side of the pump 10 and the numeral 28 designates a vacuum booster as well known in the art.

Figure 3:
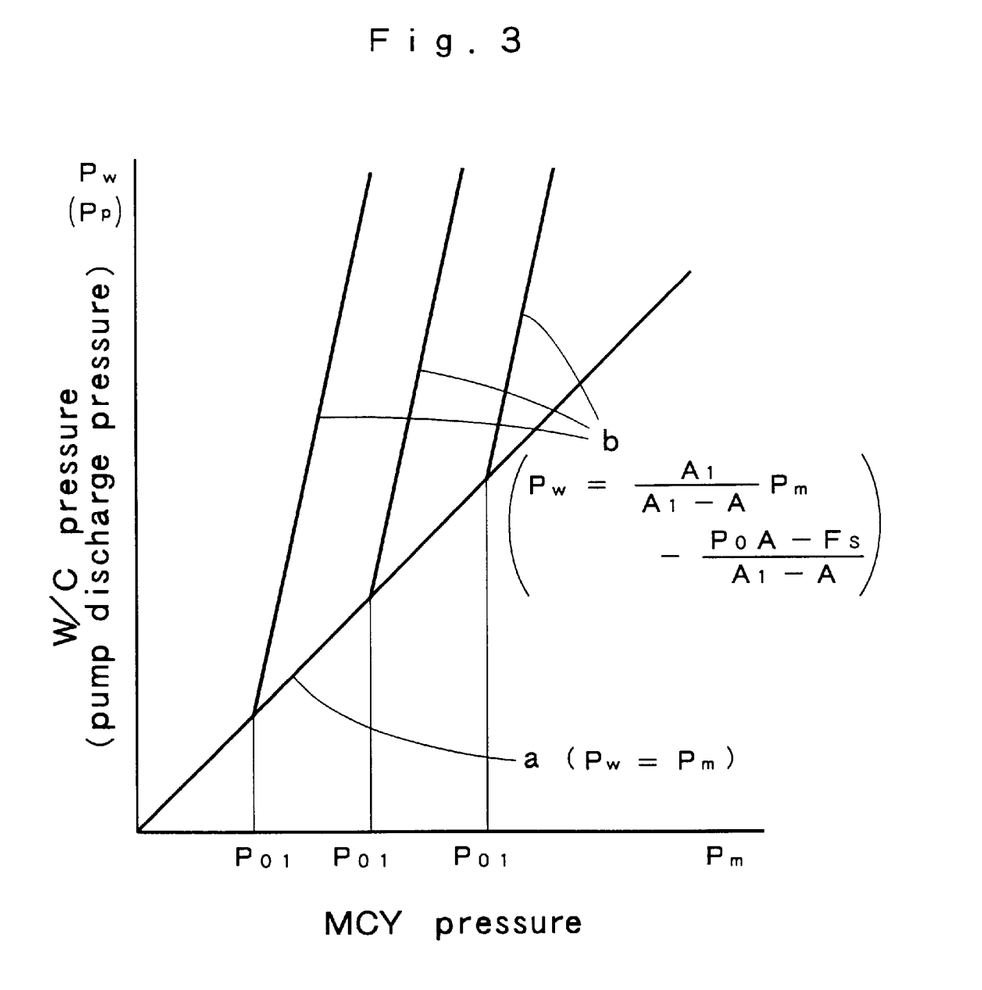
FIG. 3 is a graph showing the relation between MCY pressure and W/C pressure in a supplemental braking control by the supplemental pressure-regulating valve shown in FIG. 2.

When the supplemental pressure-regulating valve 13 is not in operation, the supplemental pressure piston 20 and the control piston 23 are positioned as shown in the drawing so that the valve portion 20a is spaced apart from the valve seat 18 and the MCY connection port 15 and the W/C & pump connection port 16 communicate with each other. Therefore, in this state, the MCY pressure Pm is freely supplied to each W/C 7 and there is a linear relationship between MCY pressure Pm and W/C pressure Pw of the W/C 7 along a line a of Pw=Pm as shown in FIG. 3.

When the supplemental pressure-regulating valve 13 is in operation, the supplemental pressure piston 20 moves downward so that the valve portion 20a is seated in the valve seat 18, thereby breaking the communication between the MCY connection port 15 and the W/C & pump connection port 16. Based on the equilibrium of forces at this point, the relation between the MCY pressure Pm and the W/C pressure Pw is given by the following Expression 1:

$$Pw=\{A_1/(A_1-A)\}\cdot Pm-\{(P_0\cdot A-Fs)/(A_1-A)\} \qquad \text{Expression 1}$$

Pw: W/C pressure, Pm: MCY pressure
P0: W/C pre-charge pressure in the control chamber
A1: seat area, A: piston area
Fs: valve spring force As apparent from this Expression 1, the gradient of the W/C pressure Pw grows relative to the MCY pressure Pm and after the valve portion 20a of the supplemental pressure piston 20 is seated in the valve seat 18, the W/C pressure Pw significantly increases corresponding to the increase in the MCY pressure Pm along the line b of Expression 1 as shown in FIG. 3. That is, the W/C pressure Pw when the supplemental pressure-regulating valve 13 is in operation is greater than the W/C pressure Pw when the supplemental pressure-regulating valve 13 is in non-operation. The supplemental braking control is carried out in this manner. At this point, each supplemental pressure piston 20 and each valve seat 18 constitute a booster piston.

The operation of the supplemental pressure-regulating valve 13 is controlled by controlling the pump 10 and the first switching valve 25. That is, by stopping the pump 10 and setting the first switching valve 25 at the connecting portion I, the supplemental pressure-regulating valve 13 is brought into non-operation. On the other hand, by actuating the pump 10 and setting the first switching valve 25 at the interrupting position II, the supplemental pressure-regulating valve 13 is brought into operation. Accordingly, by properly controlling the actuation of the pump 10 and the setting of the first switching valve 25 to the interrupting position II, the pre-charge pressure P0 in the control chamber 22, i.e. the initial operating pressure of the supplemental pressure-regulating valve 13, can be set at any pressure P01, P02, P03.

The conditions under which the supplemental pressure-regulating valve 13 is brought into operation, i.e. the conditions under which the supplemental braking control is carried out, are that the braking forces tend to be insufficient. In the brake system 1 of this embodiment, consequently it can be judged whether the braking forces tend to be insufficient, i.e. braking forces corresponding to the pedaling condition of the brake pedal 3 are not given. How to judge whether the braking forces tend to be insufficient will be concretely described hereinafter.

The braking forces tend to be insufficient when the driver operates for emergency braking. In this case, for example, the following requirements are set for judgment. When one of the requirements is met, it is decided that the driver operates for emergency braking and the braking forces tend to be insufficient. The requirements are:

(1) that the speed per stroke of the brake pedal 3 exceeds the reference value, (2) that the speed of increase in the leg-power exerted on the brake pedal 3 exceeds the reference value, and (3) that the speed per stroke of the brake pedal 3 exceeds the reference value and the leg-power exerted on the brake pedal 3 exceeds the reference value.

It should be understood that though there is no illustration in the drawings, a pedaling condition detecting means such as a pedal stroke sensor is used for detecting the pedaling conditions such as the pedal stroke of the brake pedal 3 and a leg-power meter is used for detecting the leg-power of the brake pedal 3.

Another one of causes of the tendency toward insufficient braking forces is that the pressure of the pressure source of the brake booster is lowered to the predetermined pressure for some reason. As a result of this, the required braking pressure is not given so that the braking forces are insufficient. In this case, for example, when it is decided that the pressure of the pressure source is lower than the predetermined pressure and the brake pedal 3 is pedaled, it is decided that the braking forces tend to be insufficient. In this case, though there is no illustration in the drawings, a pressure detecting means such as a pressure sensor or a pressure switch is used for detecting the pressure of the pressure source and a pedal switch is used for detecting the operation of the brake pedal 3.

Another one of causes of the tendency toward insufficient braking forces is that the pressure in a power house or a variable pressure chamber of the brake booster into which the working fluid is supplied from the pressure source during braking can not rise to the pressure corresponding to the pedaling condition of the brake pedal 3 for some reason. As a result of this, the required braking pressure is not given so that the braking forces are insufficient. In this case, for example, when it is decided that the pressure in the power house of the brake booster is lower than the reference value corresponding to the pedaling condition of the brake pedal 3, it is decided that the braking forces tend to be insufficient. In this case, it should be understood that through there is no illustration in the drawings, a pressure detecting means as mentioned above is used for detecting the pressure in the power house or the variable pressure chamber and a pedaling condition detecting means as mentioned is used for detecting the pedaling condition of the brake pedal 3.

It should be noted that the conditions for deciding that the braking forces tend to be insufficient during emergency braking and the conditions for deciding that the braking forces tend to be insufficient because of the pressure drop in the power house or the variable pressure chamber are not limited to the aforementioned conditions and any condition which enables the aforementioned decision may be set.

In addition, the decision that the braking forces tend to be insufficient may be made in any case where it is decided that the braking forces tend to be insufficient and the cases are not limited to the case of emergency braking or the pressure drop in the power house or the variable pressure chamber and may be any case.

In the brake system 1 in this embodiment as structured above, when the brakes are not in operation, the pumps 10 are stopped just as the conventional brake system, the ABS control holding valves 6, the ABS control pressure-reducing valves 8, the supplemental pressure-regulating valves 13, and the first and second switching valves 25, 26 are set at the positions I as shown in the drawing. In this state, there is no brake fluid pressure is developed on the W/Cs 7.

During a normal braking performed by pedaling the brake pedal 3, the pumps 10, the ABS control holding valves 6, the ABS control pressure-reducing valves 8, the supplemental pressure-regulating valves 13, and the first and second switching valves 25, 26 are set the same as the case of non-operation. By pedaling the brake pedal 3, the vacuum booster 28 boosts the leg-power and then outputs, thereby actuating the MCY 4 to develop the MCY fluid pressure Pm. The MCY fluid pressure Pm is delivered as brake fluid pressure to the W/Cs 7 through the MCY connection ports 15 of the supplemental pressure-regulating valves 13, respective spaces between the valve portions 20a and the ring-like valve seats 18, the W/C pump connection ports 16, and the ABS control holding valves 6, thereby braking the front and rear wheels F and R. As for the rear wheel brakes, the MCY fluid pressure Pm is delivered further through the PVs 12.

During the normal braking, the pumps 10 are not actuated and the first switching valves 25 are set at the communicating position I so that the supplemental pressure-regulating valves 13 are in non-operation. That is, MCY pressures Pm outputted through the W/C & pump connection ports 16 are provided to the control chambers 22 through the first switching valves 25 and the control pressure supply ports 17. Since the effective area presented to the wind of the rod portion 20b is equal to that of the control piston 23, the force that the MCY pressure Pm outputted through the MCY connection port 15 pushes the supplemental pressure piston 20 downward is equal to the spring force of the control spring 24 defined by the force that the MCY pressure Pm provided into the control chamber 22 pushes the control piston 23 upward. In addition, the supplemental pressure pistons 20 are pushed upward by the spring forces Fs of the valve springs 21. Therefore, the supplemental pressure pistons 20 do not move downward. As a result of this, the supplemental pressure-regulating valves 13 are put into non-operation so that the supplemental braking control is not provided.

Accordingly, during the normal braking, the valve portions 20a are left apart form the valve seats 18, the MCY pressure Pm is freely applied as it is to the W/Cs 7 so that the W/C pressure Pw rises corresponding to the rise in the MCY pressure Pm along the line Pw=Pm as shown in FIG. 3.

When canceling the braking by releasing the brake pedal 3, the MCY 4 is brought into non-operation so as to cancel the MCY fluid pressure Pm, thereby also canceling the W/C pressures Pw in the W/Cs 7 and the MCY pressures Pm in the control chambers 22 and thus canceling the braking on the front and rear wheels F and R.

When at least one of the front and rear wheels F, R tends to lock during braking, the electronic control unit sets the second switching valves 26 at the interrupting position II and controls the ABS control modulators 11 just as the conventional brake system mentioned above. Thus, the ABS control is performed by holding, reducing, and increasing the brake fluid pressures until completely canceling the tendency toward wheel lock. During the ABS control, the first switching valve 25 is set at the communicating position I so that the supplemental pressure-regulating valves 13 are in non-operation. Therefore, just as the case of normal braking, the supplemental pressure pistons 20 do not move downward so that the supplemental pressure-regulating valves 13 are in non-operation, that is the supplemental braking control is not provided.

When it is decided that the braking forces corresponding to the pedaling condition of the brake pedal 3 are not given and the braking forces tend to be insufficient, the electronic control unit sets the first switching valves 25 at the respective interrupting positions II and actuates the pumps 10 to bring the supplemental pressure-regulating valves 13 into operation. That is, the control chambers 22 are sealed and the pressures P0 when the first switching valves 25 are interrupted are sealed in the control chambers 22. On the other hand, the pumps 10 are actuated so as to supply the discharge pressure to the supplemental pressure-regulating valves 13 through the W/C & pump connecting ports 16 so that the MCY pressures Pm in the housing 14 which are supplied through the MCY connecting ports 15 rise, thereby increasing the forces pushing down the supplemental pressure pistons 20. Accordingly the supplemental pressure pistons 20 moves downward against the forces that push the supplemental pressure pistons 20 upward by the setting spring forces Fs of the valve springs 21 and the spring forces of the control springs 24 defined by the forces of the pre-charge pressures P0 of control chambers 22 pushing the control pistons 23 upward, that is, in such a manner that the springs 21 and 24 are compressed. Therefore, the valve portions 20a of the supplemental pressure pistons 20 are seated in the valve seats 18 to break the communication between the MCY connection ports 15 and the W/C & pump connection ports 16. After that, the supplemental braking control is carried out as mentioned above so as to give braking forces greater than the braking forces of normal braking, thereby compensating lack of braking force. In this manner, even when the braking forces are insufficient, the braking forces are intensified to ensure the operation of brakes.

According to the brake system 1 of this embodiment, the ABS control is provided when there is a tendency toward wheel lock and the supplemental braking control is provided when the braking forces are insufficient.

In the supplemental braking control, the W/C pressures Pw rise along the line a as shown in FIG. 3 and after the supplemental pressure-regulating valves are brought into operation, rise along any line b following the rising along the line a. Therefore, the driver does not feel a sense of incongruity due to discontinuity in the rising in brake fluid pressures on the W/Cs 7.

The initial operating pressure, i.e. initial increasing pressure, of the supplemental pressure-regulating valves 13 can be freely selected so as to correspond to various conditions of insufficient braking force. In this case, since the supplemental pressure-regulating valves 13 starts to increasing the pressure at substantially the same time that the pumps 10 are actuated and the first switching valve 25 is set at the interrupting positions II, the response to the supplemental braking control is well and the braking forces can be intensified when necessary without delay.

Since the pumps 10 used in the conventional brake system 1 having ABS 2 well known in the art can be used for the supplemental braking control, the supplemental braking control is easily provided without pump used exclusively for the supplemental braking control and the system can be simply structured at low cost.

Though the aforementioned embodiment has been described with regard to the brake system 1 having the ABS 2, the present invention may be applied to a brake system having a traction control system (hereinafter, sometimes referred to as "TRC") which cancels a tendency toward slipping by braking driving wheels in such a manner as to control the driving forces of the driving wheels when there is the tendency toward wheel slipping and a brake system having both of the ABS and the TRC. In the case where the present invention is applied to the brake system having the TRC, pumps for controlling the TRC can be used for the supplemental braking control.

Though the aforementioned embodiment has been described with regard to the brake system 1 of a rear drive vehicle and of X-type piping and which has the vacuum booster, the present invention may be applied to a brake system of which brake piping is of any type or a brake system with a brake booster such as a hydraulic booster other than the vacuum booster or without any brake booster if the brake system is provided with the ABS 2 and/or TRC.

In the case where the present invention is applied to the brake system without any brake booster, after the first switching valves 25 are set at the interrupting positions II, the MCY pressures Pm are increased with slightly more leg-power on the brake pedal 3 so that the valve portions 20 of the supplemental pressure pistons 20 are seated in the seat valves 18.

As apparent from the above description, in the brake system of the present invention, the supplemental braking control is provided by the supplemental pressure-regulating means. Therefore, even when the braking forces are insufficient during braking, the braking forces are intensified to ensure the operation of brakes.

Since the brake fluid pressure is increased continuously and smoothly by the supplemental pressure-regulating means during the supplemental braking control so that braking forces vary continuously corresponding to the leg-power on the brake pedal, the driver does not feel a sense of incongruity. For the supplemental braking control, the brake fluid pressure can be adjusted corresponding to the will of the driver by the supplemental pressure-regulating means.

In addition, according to the present invention, the start of operation or increase in pressure of the supplemental pressure-regulating means can be freely selected by freely operating the first switching valve, thereby corresponding to various conditions of insufficient braking force.

The booster piston of the supplemental pressure-regulating means starts to increase the pressure at substantially the same time that the pumps for supplying brake fluid are actuated, thereby providing well response to the supplemental braking control and thus intensifying the braking forces when necessary without delay.

Furthermore, by using the pumps for supplying brake fluid well known in the art, the supplemental braking control is easily provided without pump used exclusively for the supplemental braking control and the system can be simply structured at low cost.

Particularly, according to the present invention, the ABS control can also be provided.

What we claim is:

1. A brake system comprising:
   a brake operating member,
   a master cylinder which is actuated by operating said brake operating member to develop master cylinder fluid pressure with brake fluid,
   a brake cylinder to which the master cylinder fluid pressure is applied through a brake fluid line to produce braking forces,
   a brake fluid pump for supplying the brake fluid to the brake fluid line,
   fluid pressure-regulating means for regulating brake fluid pressure,
   a controller for controlling said fluid pressure-regulating means, said controller controlling said fluid pressure-regulating means for performing brake fluid pressure control,
   supplemental pressure-regulating means disposed in said brake fluid line between said master cylinder and a supplying portion into which said brake fluid pump supplies said brake fluid, said supplemental pressure-regulating means having a booster piston and a control chamber attached to the booster piston, wherein said booster piston allows said master cylinder fluid pressure to pass as it is to said brake cylinder when said booster piston is in non-operation and prevents said master cylinder fluid pressure to pass therethrough when said booster piston is in operation, said master cylinder fluid pressure is freely supplied to said control chamber when said booster piston is held in non-operation, and said booster piston is held in operation when the control chamber is sealed, said brake fluid pump operating to provide pressure higher than the master cylinder fluid pressure to the brake cylinder when the control chamber is sealed, and a first switching valve controlled by said controller, wherein said first switching valve makes said control chamber open when the first switching valve is in non-operation, and makes said control chamber sealed when the first switching valve is in operation, said controller actuating said first switching valve and said brake fluid pump when the braking forces tend to be insufficient.

2. A brake system as claimed in claim 1, wherein said first switching valve includes an opening position as the non-operation of the first switching valve, and an interrupting position as the operation thereof.

3. A brake system comprising:

a brake operating member, a master cylinder which is actuated by operating said brake operating member to develop master cylinder fluid pressure with brake fluid, a brake cylinder to which the master cylinder fluid pressure is applied through a brake fluid line to produce braking forces, a brake fluid pump for supplying the brake fluid to the brake fluid line, fluid pressure-regulating means for regulating brake fluid pressure, said fluid pressure-regulating means being a modulator for anti-skid control which operates when an anti-skid brake control is made, said modulator including a holding valve for holding the brake fluid pressure in said brake cylinder, a pressure-reducing valve for reducing the brake fluid pressure in said brake cylinder, a low pressure accumulator into which the brake fluid is discharged from said brake cylinder when said brake fluid pressure is reduced, and an anti-skid control pump constituted by said brake fluid pump which supplies the brake fluid discharged into said low pressure accumulator to said brake fluid line, a controller for controlling said fluid pressure-regulating means, said controller controlling said fluid pressure-regulating means for performing brake..fluid pressure control, supplemental pressure-regulating means disposed in said brake fluid line between said master cylinder and a supplying portion into which said brake fluid pump supplies said brake fluid, said supplemental pressure-regulating means having a booster piston and a control chamber attached to the booster piston, wherein said booster piston allows said master cylinder fluid pressure to pass as it is to said brake cylinder when said booster piston is in non-operation and prevents said master cylinder fluid pressure to pass therethrough when said booster piston is in operation, said master cylinder fluid pressure is freely supplied to said control chamber when said booster piston is held in non-operation, and said booster piston is held in operation when the control chamber is sealed, said brake fluid pump operating to provide pressure higher than the master cylinder fluid pressure to the brake cylinder when the control chamber is sealed, a first switching valve controlled by said controller, wherein said first switching valve makes said control chamber open when the first switching valve is in non-operation, and makes said control chamber sealed when the first switching valve is in operation, said controller actuating said first switching valve and said brake fluid pump when the braking forces tend to be insufficient, and a second switching valve opened by the controller at least when the braking force tends to be insufficient, a suction side of the anti-skid control pump communicating with the brake fluid line between the supplemental pressure-regulating means and the master cylinder through the second switching valve.

4. A brake system comprising:

a brake operating member, a master cylinder which is actuated by operating said brake operating member to develop master cylinder fluid pressure with brake fluid, a brake cylinder to which the master cylinder fluid pressure is applied through a brake fluid line to produce braking forces, a brake fluid pump for supplying the brake fluid to the brake fluid line, fluid pressure-regulating means for regulating brake fluid pressure, a controller for controlling said fluid pressure-regulating means, said controller controlling said fluid pressure-regulating means for performing brake fluid pressure control, supplemental pressure-regulating means disposed in said brake fluid line between said master cylinder and a supplying portion into which said brake fluid pump supplies said brake fluid, said supplemental pressure-regulating means having a booster piston, a booster chamber containing said booster piston, a control chamber attached to the booster piston, a control piston disposed in said control chamber, and an air chamber situated between the booster chamber and the control chamber, wherein said booster piston allows said master cylinder fluid pressure to pass as it is to said brake cylinder when said booster piston is in non-operation and prevents said master cylinder fluid pressure to pass therethrough when said booster piston is in operation, said master cylinder fluid pressure is freely supplied to said control chamber when said booster piston is held in non-operation, and said booster piston is held in operation when the control chamber is sealed, said brake fluid pump operating to provide pressure higher than the master cylinder fluid pressure to the brake cylinder when the control chamber is sealed, and a first switching valve controlled by said controller, wherein said first switching valve makes said control chamber open when the first switching valve is in non-operation, and makes said control chamber sealed when the first switching valve is in operation, said controller actuating said first switching valve and said brake fluid pump when the braking forces tend to be insufficient.

* * * * *